(12) United States Patent
Gusat et al.

(10) Patent No.: US 11,809,267 B2
(45) Date of Patent: Nov. 7, 2023

(54) ROOT CAUSE ANALYSIS OF COMPUTERIZED SYSTEM ANOMALIES BASED ON CAUSAL GRAPHS

(71) Applicant: INTERNATIONAL BUSINESS MACHINES CORPORATION, Armonk, NY (US)

(72) Inventors: Mircea R. Gusat, Langnau am Albis (CH); Lili Lyubchova Georgieva, Sofia (BG); Serge Monney, Pully (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/658,483

(22) Filed: Apr. 8, 2022

(65) Prior Publication Data
US 2023/0325269 A1 Oct. 12, 2023

(51) Int. Cl.
*G06F 11/07* (2006.01)
(52) U.S. Cl.
CPC ........ *G06F 11/079* (2013.01); *G06F 11/0709* (2013.01)
(58) Field of Classification Search
CPC ............................ G06F 11/079; G06F 11/0709
See application file for complete search history.

(56) References Cited

U.S. PATENT DOCUMENTS

| | | | |
|---|---|---|---|
| 2020/0287923 A1 | 9/2020 | Raghavendra | |
| 2020/0409781 A1* | 12/2020 | Zhen | G06F 11/3006 |
| 2022/0318082 A1* | 10/2022 | Slinger | G06F 11/0772 |

FOREIGN PATENT DOCUMENTS

WO 2021045719 A1 3/2021

OTHER PUBLICATIONS

Bach et al., "On Pixel-Wise Explanations for Non-Linear Classifier Decisions by Layer-Wise Relevance Propagation," PLOS One, Jul. 10, 2015, DOI:10.1371/journal.pone.0130140, 46 pages.
(Continued)

*Primary Examiner* — Jigar P Patel
(74) *Attorney, Agent, or Firm* — Anthony M. Pallone

(57) ABSTRACT

An embodiment for root cause analysis of computerized system anomalies is provided. The embodiment may include monitoring key performance indicators (KPIs) for a computerized system, wherein KPI values of the monitored KPIs form respective timeseries. The embodiment may include detecting an anomaly in the computerized system based on the monitored KPIs. The embodiment may include determining a troubleshooting time window extending over a given time period. The embodiment may include identifying a strict subset of the monitored KPIs based on portions of the respective timeseries spanning the given time period. The strict subset comprises abnormal KPIs (aKPIs) and potential explanatory KPIs (xKPIs). The embodiment may include obtaining a causal graph of vertices mapping KPIs of the strict subset by running a causality algorithm to evaluate weights of directed edges connecting the vertices and accordingly obtain one or more directed paths. The embodiment may include returning the obtained causal graph.

20 Claims, 6 Drawing Sheets

(56) References Cited

OTHER PUBLICATIONS

Grace Period Disclosure, "CCA: An ML Pipeline for Cloud Anomaly Troubleshooting," Lili Georgieva et al. AAAI 2022, 36th AAAI Conference on Artificial Intelligence, Feb. 22, 2022, IBM Zurich Research Laboratory, 3 pages.

Grace Period Disclosure, "Cloud Causality Analyzer for Anomaly Detection," Master Thesis, L. Georgieva, Apr. 14, 2021, Department of Information Technology and Electrical Engineering, ETH Zurich, 80 pages.

Heskes et al., "Causal Shapley Values: Exploiting Causal Knowledge to Explain Individual Predictions of Complex Models," 34th Conference on Neural Information Processing Systems (NeurIPS 2020), https://proceedings.neurips.cc//paper/2020/file/32e54441e6382a7fbacbbbaf3c450059-Paper.pdf, 12 pages.

Lundberg et al., "A Unified Approach to Interpreting Model Predictions," 31st Conference on Neural Information Processing Systems (NIPS 2017), arXiv:1705.07874v2 [cs.AI] Nov. 25, 2017, https://arxiv.org/pdf/1705.07874v2.pdf, 10 pages.

Nauta et al., "Causal Discovery with Attention-Based Convolutional Neural Networks," MDPI, Mach. Learn. Knowl. Extr. 2019, 1, 19; doi:10.3390/make1010019, Jan. 7, 2019, 28 pages.

Nauta, Temporal Causal Discovery and Structure Learning with Attention-Based Convolutional Neural Networks, University of Twente, Master's Thesis, Aug. 2018, https://essay.utwente.nl/76360/1/Nauta_MA_EEMCS.pdf, 72 pages.

Qiao et al., "Multiple Time Series Anomaly Detection Based on Compression and Correlation Analysis: A Medical Surveillance Case Study," Springer, APWeb 2012, LNCS 7235, pp. 294-305, 2012, https://link.springer.com/chapter/10.1007/978-3-642-29253-8_25.

Qiu et al., "Granger Causality for Time-Series Anomaly Detection," IEEE, 2012 IEEE 12th International Conference on Data Mining, https://ieeexplore.ieee.org/document/6413806, pp. 1074-1079.

Ribeiro et al., "Why Should I Trust You? Explaining the Predictions of Any Classifier," arXiv:1602.04938v3 [cs.LG] Aug. 9, 2016, https://arxiv.org/pdf/1602.04938v3.pdf, 10 pages.

Schockaert et al., "A Causal-based Framework for Multimodal Multivariate Time Series Validation Enhanced by Unsupervised Deep Learning as an Enabler for Industry 4.0," arXiv:2008.02171 [cs.LG], Aug. 5, 2020, https://arxiv.org/ftp/arxiv/papers/2008/2008.02171.pdf, 9 pages.

Shrikumar et al, Learning Important Features Through Propagating Activation Differences, arXiv:1704.02685v2 [cs.CV] Oct. 12, 2019, https://arxiv.org/pdf/1704.02685v2.pdf, 9 pages.

Takeishi et al., "On Anomaly Interpretation via Shapley Values," arXiv:2004.04464v1 [cs.LG] Apr. 9, 2020, https://arxiv.org/pdf/2004.04464.pdf, 23 pages.

Thalheim et al., "Sieve: Actionable Insights from Monitored Metrics in Microservices," arXiv:1709.06686v1 [cs.DC] Sep. 20, 2017, https://arxiv.org/pdf/1709.06686v1.pdf, 17 pages.

Zhao et al., "Multivariate Time-series Anomaly Detection via Graph Attention Network," arXiv:2009.02040v1 [cs.LG] Sep. 4, 2020, https://arxiv.org/pdf/2009.02040.pdf, 10 pages.

Gusat et al., "Characterizing a Computerized System Based on Clusters of Key Performance Indicators," Application and Drawings, Filed on Feb. 16, 2022, 35 Pages, U.S. Appl. No. 17/651,386.

Gusat et al., "Characterizing a Computerized System With an Autoencoder Having Multiple Ingestion Channels," Application and Drawings, Filed on Feb. 16, 2022, 35 Pages, U.S. Appl. No. 17/651,391.

* cited by examiner

ROOT CAUSE ANALYSIS OF COMPUTERIZED SYSTEM ANOMALIES BASED ON CAUSAL GRAPHS

STATEMENT REGARDING PRIOR DISCLOSURES BY THE INVENTOR OR A JOINT INVENTOR

The following disclosures are submitted under 35 U.S.C. 102(b)(1)(A):

The document "Cloud Causality Analyzer for Anomaly Detection", Swiss Federal Institute of Technology Zurich, Master Thesis, was authored by Lili L. Georgieva, co-inventor of the present invention, and published on Apr. 14, 2021.

The document "CCA: An ML Pipeline for Cloud Anomaly Troubleshooting", AAAI 2022, 36th AAAI Conference on Artificial Intelligence, was authored by Lili L. Georgieva, Ioana Giurgiu, Serge Monney, Haris Pozidis, Viviane Potocnik, and Mircea R. Gusat, and published on Feb. 22, 2022, as a preliminary preprint version (https://aaai-2022.virtualchair.net/poster_dm285).

BACKGROUND

The invention relates in general to the field of computer-implemented methods of root cause analysis of computerized system anomalies. In particular, it is directed to methods that apply a reduced subset of judiciously selected key performance indicators (KPIs) to detect cloud performance anomalies and their respective root causal culprits.

In recent years, explainability and causality have been the subject of increasing interest in the machine learning community. Given the proliferation of complex, black-box neural network models, many called for the need to explain model predictions and deepen the causal discovery of true causes of predicted outcomes. In particular, one important area in the cybersecurity and cloud computing domain is anomaly detection (AD), which relates to the identification of rare or unexpected events or data patterns in computerized systems.

Various application- and data-specific statistical and deep learning models have been proposed for detecting and analyzing anomalies in computerized systems. Explainability methods generally fail to drill in deeper from causal inference of symptoms to root cause analysis (RCA)—inferring the faults that generated the observed symptoms—while baseline causality methods suffer from inefficiency and scalability issues when run on large datasets.

The following references form part of the background art:
[1] Sebastian Bach, Alexander Binder, Gregoire Montavon, Frederick Klauschen, Klaus-Robert Müller, and Wojciech Samek. On pixel-wise explanations for non-linear classifier decisions by layer-wise relevance propagation. PLOS ONE, 10(7):1-46, 07 2015;
[2] Scott Lundberg and Su-In Lee. A unified approach to interpreting model predictions. CoRR, abs/1705.07874, 2017;
[3] Marco Tulio Ribeiro, Sameer Singh, and Carlos Guestrin. "why should I trust you?": Explaining the predictions of any classifier. CoRR, abs/1602.04938, 2016;
[4] Avanti Shrikumar, Peyton Greenside, and Anshul Kundaje. Learning important features through propagating activation differences. CoRR, abs/1704.02685, 2017;
[5] Jorg Thalheim, Antonio Rodrigues, Istemi Ekin Akkus, Pramod Bhatotia, Ruichuan Chen, Bimal Viswanath, Lei Jiao, and Christof Fetzer. Sieve: Actionable insights from monitored metrics in microservices. CoRR, abs/1709.06686, 2017; and
[6] Meike Nauta, Doina Bucur, and Christin Seifert. Causal discovery with attention-based convolutional neural networks. Machine Learning and Knowledge Extraction, 1(1):312-340, 2019.

BRIEF SUMMARY

According to a first aspect, the present invention is embodied as a computer-implemented method of root cause analysis of computerized system anomalies. The method comprises monitoring key performance indicators, or KPIs, for a computerized system of interest, wherein KPI values of the monitored KPIs form respective timeseries. An anomaly occurring in the system of interest is detected, based on the monitored KPIs. The method then determines a troubleshooting time window, which extends over a given time period, in accordance with the detected anomaly. Next, two steps are performed based on portions of the timeseries corresponding to the KPIs, where the timeseries portions considered span the above given time period. In practice, the timeseries formed by the monitored KPIs may be cropped to obtain timeseries portions corresponding to this time period. First, a strict subset of the monitored KPIs are identified. This subset includes, on the one hand, abnormal KPIs and potential explanatory KPIs, respectively noted aKPIs and xKPIs. Second, a causal graph is obtained. This graph includes vertices mapping the KPIs of the strict subset of KPIs identified, i.e., the aKPIs and xKPIs. The causal graph is obtained by running a causality algorithm, to evaluate weights of directed edges connecting the vertices and accordingly obtain one or more directed paths, where each path connects one of the xKPIs to one of the aKPIs. Such paths reflect causality chains that can be further investigated by experts, whether machines or humans. To that aim, the method eventually returns the obtained causal graph to help troubleshoot the detected anomaly.

The strict subset of KPIs may advantageously be identified by leveraging a feature importance attribution algorithm. That is, the aKPIs will preferably be identified based on outputs from an anomaly detection algorithm run to detect said anomaly. Next, the feature importance attribution algorithm can be run to determine relative importance values of the monitored KPIs to each of the identified aKPIs. Because of the troubleshooting time window and the corresponding timeseries portions considered, the relative importance values determined pertain to the time period of the troubleshooting time window. The relative importance values make it possible to restrict the number of potential causal KPIs. That is, the xKPIs are identified based on the relative importance values determined. The feature importance attribution algorithm is preferably an additive feature attribution algorithm, to ease computations. The importance values may for instance be Shapley values, which are associated with edges connecting the vertices corresponding to the xKPIs and the aKPIs.

In embodiments, the causality algorithm run to obtain the causal graph includes independent causality algorithms, such that distinct causal graphs are obtained, which can nevertheless be combined into a composite causal graph. So, the graph eventually returned may be the composite graph. This graph may further combine a preliminary graph reflecting the Shapley values. Various causality chains can accordingly be identified and provided to experts, for investigation purposes.

In preferred embodiments, one of the independent causality algorithms is a pairwise temporal causality algorithm, e.g., based on a statistical, pairwise co-determination method. This algorithm performs a temporal causality test (e.g., a Granger causality test), which determines a causal direction and a corresponding weight for each pair of the vertices. This allows the directed edges and the corresponding weights to be determined. This algorithm is preferably followed by a validation algorithm, to discard some of the directed edges determined by the temporal causality algorithm, starting with edges corresponding to bidirectional causations.

In embodiments, a second independent causality algorithm is a cognitive algorithm that learns a causal graph structure of the causal graph by discovering causal relationships between the xKPIs and the aKPIs.

The proposed root cause analysis method is preferably executed last in a pipeline involving feature engineering, dimension reduction, and clustering.

According to another aspect, the invention is embodied as a computer program product for root cause analysis of computerized system anomalies. The computer program product comprises a tangible computer readable storage medium having program instructions embodied therewith. The program instructions are executable by processing means to cause the latter to perform steps according to the present methods.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Computerized methods and computer program products embodying the present invention will now be described, by way of non-limiting examples.

DETAILED DESCRIPTION

The following description is structured as follows. General embodiments and high-level variants are described, followed by preferred embodiments and then technical implementation details. Note, the present method and its variants are collectively referred to as the "present methods". All references Sn refer to methods steps of the flowcharts of FIG. 3, while numeral references pertain to devices, components, and concepts involved in embodiments of the present invention.

A first aspect of the invention is now described in reference to FIGS. 1-5. This aspect concerns a computer-implemented method of root cause analysis of computerized system anomalies. Formally, anomalies are defined as rare events that are so different from other observations that they raise suspicion concerning the mechanism that generated them. Anomalies may arise due to malicious or improper actions, frauds, or system failures, for example. An anomaly may notably be due to a data traffic anomaly, as with a network attack (e.g., on the business environment), unauthorized access, network intrusion, improper data disclosure, data leakage, system malfunction, or data and/or resources deletion. Anomaly detection is important in various domains, such as cybersecurity, fraud detection, and healthcare. An early detection is often of utmost importance as failing to act upon the causes of the anomaly can cause significant harm.

The method may for example be performed at a given computer 1, which interact with a target computerized system 2, i.e., the system of interest, for which anomalies may be detected and analyzed. The computerized system 2 may for instance be a group of networked computerized devices enabling cloud computing, as assumed in FIG. 1. In variants, the system 2 may be a datacenter, supercomputer, general-purpose computer, memory and storage hardware, load/store engine, or any other type of computerized device or system.

The method relies on key performance indicators (KPIs) of the computerized system 2. The KPIs are typically obtained from compute devices and/or storage devices composing the system 2.

Figure 3:
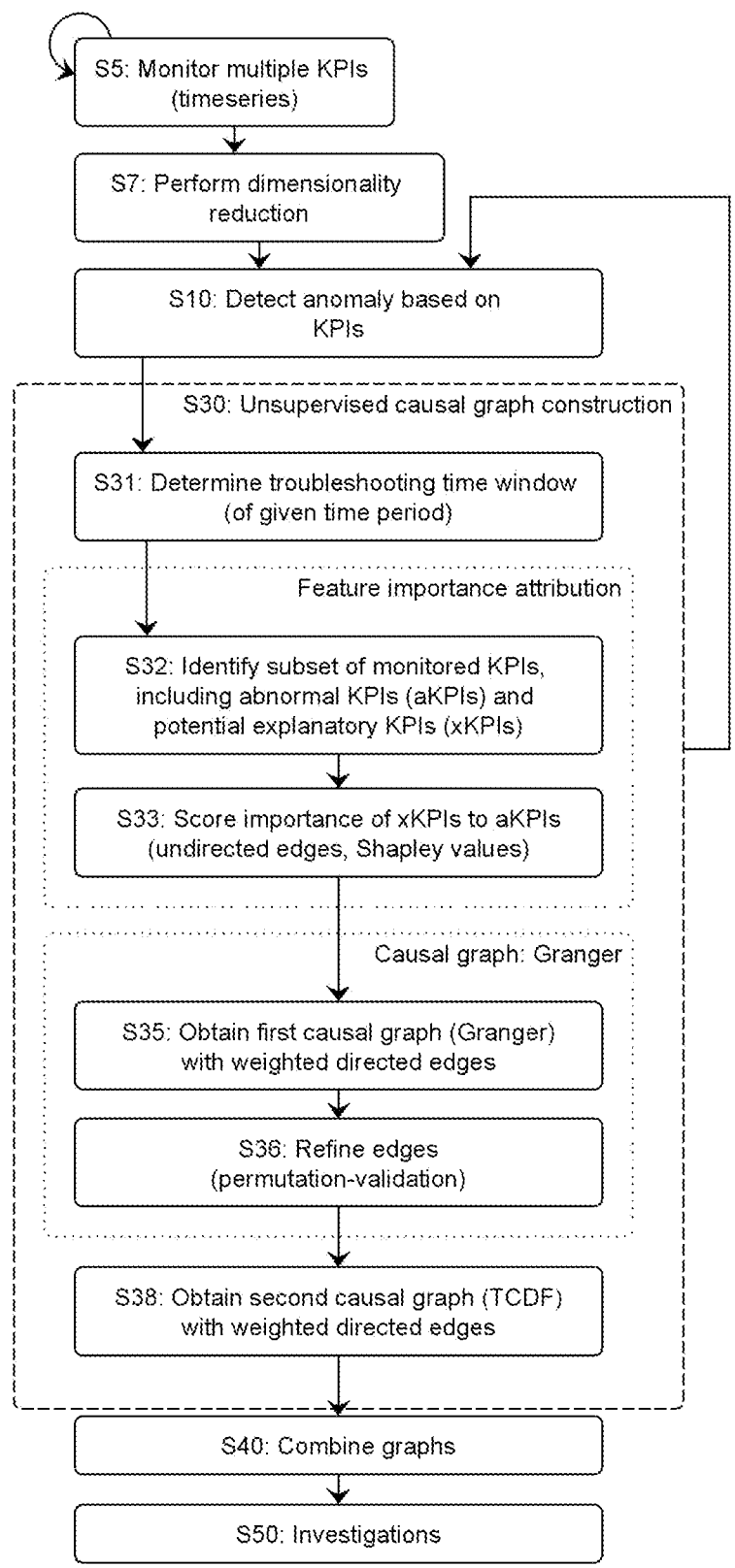
FIG. 3 is a flowchart illustrating high-level steps of a method of root cause analysis of computerized system anomalies, according to embodiments.
Figure 4:
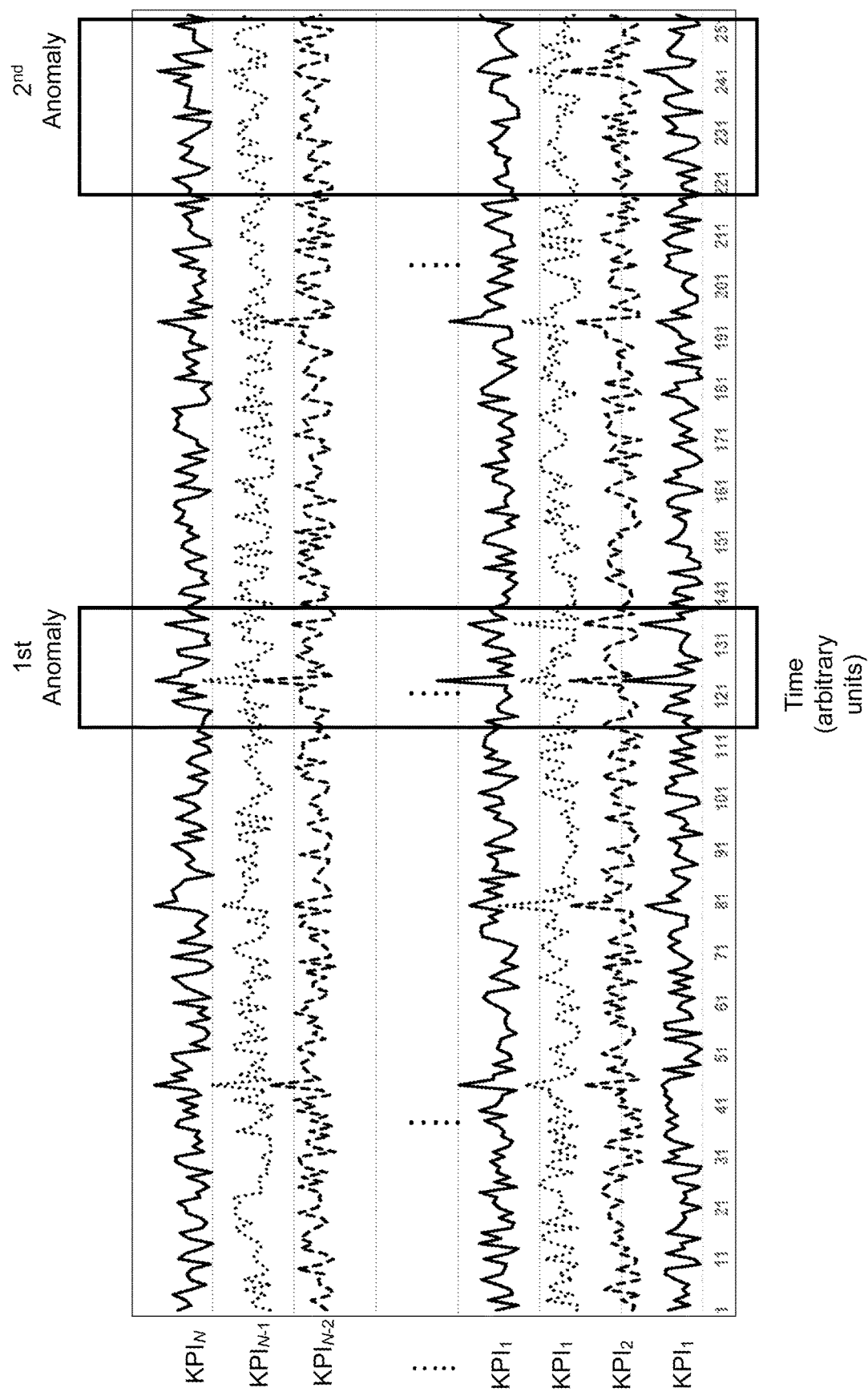
FIG. 4 is a graph representing various key performance indicators (KPIs) evolving over time. The KPI values form respective (univariate) timeseries. Two anomalies are assumed to have been detected based on such KPIs. The anomalies are depicted as corresponding time windows.

As per the present method, such KPIs are continuously monitored (see step S5 in FIG. 3). The monitored signals or data may consist of or include monotonic sequences or tabular data. The aim is to be able to detect potential anomalies in the system 2. The KPI values of the KPIs form respective timeseries. Each KPI normally corresponds to one respective quantity, such that the respective timeseries will normally be univariate. However, a KPI may, in principle, also correspond to a multivariate timeseries. The following assumes that each KPI corresponds to a univariate timeseries, for simplicity. A timeseries is a series of values (the KPI values) of a given quantity (the KPI) obtained at successive times, as illustrated in FIG. 4 for N univariate KPIs (noted $KPI_1$ to $KPI_N$). Such KPI values may for instance be continuously collected and aggregated from data streams of raw KPI values. The aggregated values are typically subject to some preprocessing, as discussed later in reference to particular embodiments.

The method may accordingly come to detect an anomaly (step S10 in FIG. 3) in the computerized system 2, based on the monitored KPIs. Any suitable anomaly detection algorithm may be used. This algorithm may for instance reflect a model, possibly an analytical model. Examples of anomaly detection algorithms and pipelines are discussed later. For example, FIG. 4 assumes that two anomalies are being detected, at different time points. The detected anomalies are depicted as corresponding time windows, which span distinct time periods.

If an anomaly is detected, the method automatically determines at S31 (or causes to determine) a troubleshooting time window, which extends over a given time period. The latter is determined in accordance with the detected anomaly. Ad hoc heuristics may be used to determine the time window, as exemplified later. The determined window may be subject to validation by an expert. That is, the method may propose a troubleshooting time window it has determined and prompt an expert to validate it. In variants, the method provides data (e.g., automatically determined endpoints of a time interval) enabling the determination of such a time window.

Next, two critical steps are performed based on portions of the timeseries of KPI values, where the time series portions span the time period corresponding to the troubleshooting time window determined. In practice, the stored timeseries will typically have to be cropped to identify the portions corresponding to the desired time period. I.e., subsets of KPI values corresponding to the desired time period are extracted from the timeseries. The following steps are based on such subsets.

First, a strict subset of the monitored KPIs are identified (step S32 in FIG. 3), where this subset includes judiciously selected KPIs. Namely, this subset includes abnormal KPIs and potential explanatory KPIs, which are respectively noted aKPIs and xKPIs to ease the exposition. Thus, the identified subset of KPIs actually consist of two subsets, which respectively include aKPIs and xKPIs. The aKPIs can be regarded as the symptoms of the detected anomaly, while the xKPIs are potential causes of such symptoms. Now, the key question to be answered is how to automatically identify the root causal culprits of the identified symptoms (the aKPIs) at an affordable computational cost? Here, things get complicated by the fact that an observed symptom may actually be the cause of another observed symptom. Thus, a sufficiently perceptive method is needed, which should nevertheless be computationally tractable.

To that aim, a second operation is performed based on the timeseries portions, i.e., based on KPI values corresponding to the determined time windows. I.e., the timeseries portions considered all have a same length and correspond to same time points. Still, the KPIs considered are restricted to the sole subset (aKPIs and xKPIs) identified above, to ease computations. The second operation aims at obtaining a causal graph, see steps S35-S38 in FIG. 3. The causal graph connects vertices, which correspond to the KPIs of the strict subset identified. That is, such KPIs are mapped onto the vertices of the graph.

The causal graph is obtained by running a causality algorithm, which evaluates weights of directed edges connecting the vertices (each directed edge corresponds to an ordered pair of vertices) and accordingly obtains one or more directed paths, where each path connects an xKPIs to an aKPIs. Several paths are obtained in practice, given the number of KPIs involved (typically a few dozen), notwithstanding the selection performed. In the present context, each directed path (or dipath) identified is a finite sequence of distinct edges, which join a sequence of distinct vertices, where the edges are all directed in a same direction, i.e., going from one xKPI to one aKPI. In principle, additional paths may possibly be identified in practice, which join several aKPIs, without involving any xKPIs.

Such paths establish causality chains, which may be worth investigating by experts, whether they be computerized processes run on computers or humans. To that aim, the method returns (i.e., stores and/or displays) the obtained causal graph, with a view to help an expert troubleshoot the detected anomaly.

The proposed method allows an explainable root cause analysis to be performed using a fully unsupervised pipeline, whereby abnormal KPIs (the symptoms of the anomaly detected) can be causally linked to explanatory KPIs (the potential causes of the symptoms). This is made possible thanks to the troubleshooting time window determined. All the KPIs subsequently considered span the same time period, which allows a variety of causal methods to be employed. In addition, the present methods works, by construction, on reduced subsets of KPIs (the aKPIs and xKPIs), which allows computationally tractable implementations of the causality algorithms. Running a causality algorithm on the entire set of KPIs would likely be prohibitive in practice, given that hundreds of KPIs may potentially be monitored in a large computerized system.

In that respect, the range of KPIs monitored may typically include between 50 and 260 KPIs, initially. However, one may preferably consider between 70 and 130 KPIs, e.g., approximately 100 KPIs. The KPIs are computed based on data collected (e.g., streamed) from the computerized system 2 of interest. The KPIs may be formed using any suitable metric. Such KPIs may for instance relate to CPU utilizations, read/write response times, and read/write input/output (I/O) rates. Other KPIs may for instance relate to access rights, disk-to-cache transfer rates or, conversely, cache-to-disk transfer rates, possibly using volume cache (VC) or volume copy cache (VCC) metrics for volumes. In practice, however, cache-related KPIs are found to be less useful than read/write data in the present context. Many other types of KPIs are known to the skilled person.

The timeseries can be aggregated based on data collected at regular time intervals from the system 2. I.e., the KPIs may be streamed and sampled at any suitable frequency, e.g., 288 times per day, i.e., every 300 seconds (every 5 minutes). Higher frequencies may be contemplated, if necessary. Still, the collected data may possibly be up/sub-sampled, in order to form the timeseries. The KPIs are formed as timeseries, i.e., as objects of the form $\{\ldots, x_{1, t-2}, x_{1, t-1}, x_{1, t}\}$, $\{\ldots, x_{n, t-2}, x_{n, t-1}, x_{n, t}\}\}$, where $\{\ldots, x_{1, t-2}, x_{1, t-1}, x_{1, t}\}$ denote values obtained at distinct time points (t) for a same KPI (here $x_1$), while $x_1, \ldots, x_n$ denote distinct KPIs. Of course, the multiple KPIs may be regarded as one multivariate timeseries.

Figure 5:
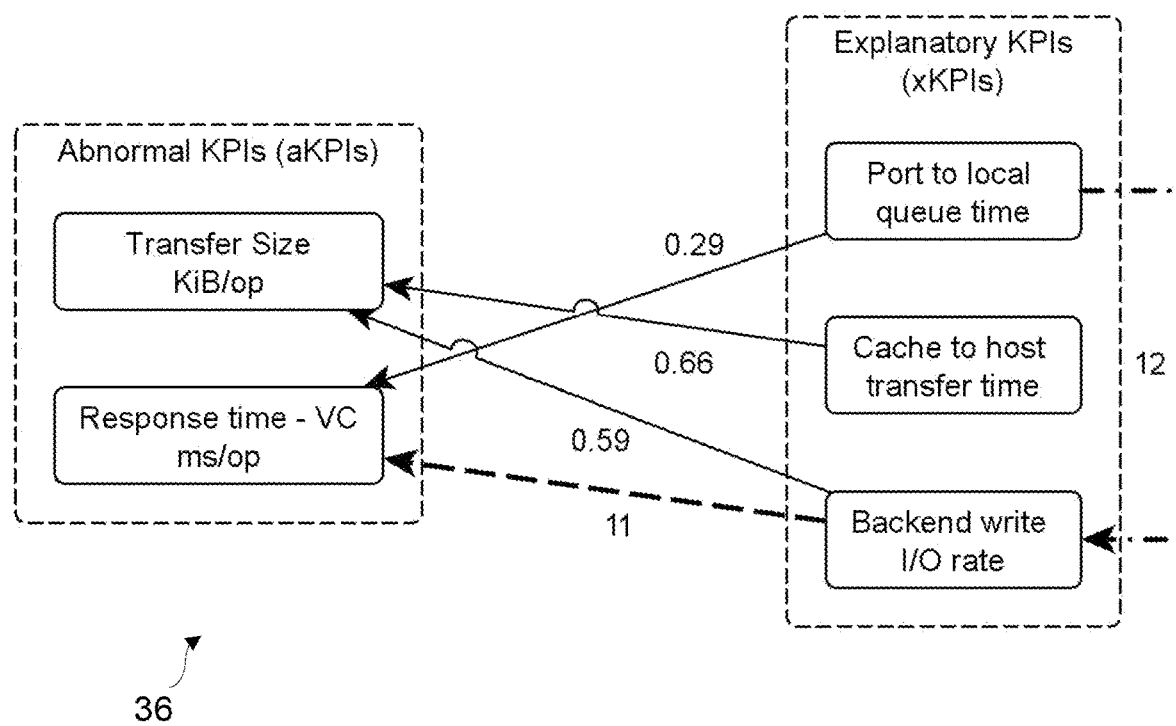
FIG. 5 is a diagram illustrating a simple composite causal graph, as obtained in embodiments. The vertices correspond, on the one hand, to identified abnormal KPIs and, on the other hand, to potential explanatory KPIs. Directed edges connect the vertices, which form paths that correspond to causality chains.

The present approach may for example be applied to build a causal, directed acyclic graph, as a causal sequence diagram that identifies the causal factors and depicts the sequence of causal relationships that lead to the occurrence of an anomaly, as illustrated in FIG. 5.

All this is now described in detail, in reference to particular embodiments of the invention. To start with, the aKPIs can be determined in accordance with the anomaly detection algorithm, e.g., based on outputs of this algorithm, as in embodiments described below. In principle the xKPIs can be determined based on statistics, e.g., as those KPIs that are mostly determined to be the causes of anomalies. However, they are preferably determined by a feature importance attribution method.

Namely, the present methods may run (step S32-S33) a feature importance attribution algorithm, where this algorithm causes to determine relative importance values of the monitored KPIs to each of the identified aKPIs during the considered time period. The relative importance values make it possible to identify the xKPIs. That is, the relative importance values are determined for connected pairs of KPIs, where such pairs are connected at one or more aKPIs. I.e., each pair consists of an aKPI and another KPI.

The xKPIs are identified as those KPIs that are the most important to the selected aKPIs. Some of the initial KPIs will be found to be unimportant, such that they can be discarded. One may possibly apply a threshold determined importance scores to identify the important xKPIs. By design, the feature importance attribution algorithm may already discard the less important KPIs. Eventually, the xKPIs can be identified as the union of the KPIs identified by the feature importance attribution algorithm (excluding the xKPIs, which are already identified at this point).

The above process automatically reduces the number of KPIs considered. In other words, using a feature importance attribution algorithm makes it possible to restrict the feature space for causal discovery to the sole set of aKPIs and xKPIs determined. Still, an importance score reflects a mutual importance between an xKPI and an aKPI; it does not provide a direction yet, hence the advantage of the causality algorithm, which is subsequently run to identify directed edges and also weight such edges.

The feature importance attribution algorithm is preferably an additive algorithm. Additive feature attribution methods are known per se; they allow a substantial simplification of the underlying computational problem. Additive feature attribution methods are local methods explaining each model prediction separately by a same, simple, interpretable explanation model. In variants, the feature importance attribution algorithm may be a multiplicative algorithm, whether linear or not.

Example of suitable feature importance attribution algorithms are:
  "LIME" (Local Interpretable Model-Agnostic Explanations), reference [3];
  "DeepLIFT" (Deep Learning Important FeaTures, reference [4]);
  "LRP" (Layer-Wise Relevance Propagation, reference [1]); and
  "SHAP" (Shapley Additive exPlanation, reference [2]).

The SHAP framework is particularly appealing, inasmuch as it unifies LIME, LRP, and DeepLIFT under the class of additive feature attribution (AFA) methods.

The relative importance values found by the feature attribution algorithm may advantageously be stored in association with edges connecting the vertices corresponding to the selected KPIs. Such values may be of interest for the subsequent investigations. In particular, the present methods may compute S33 Shapley values, based on outputs from the feature importance attribution algorithm used. To that aim, use can advantageously be made of the SHAP explainability framework. SHAP proposes a unified measure of feature importance, leading to so called SHAP values, which attribute to each feature its importance as the change in the expected model prediction when conditioning on that feature. However, exact computation of SHAP values is challenging.

Reference [2] proposes three main methods for approximating such values, which are the so-called:
  "Shapley values" approach, where a classic game-theory approach is used to retrains the model on all feature subsets and attributes to each feature an importance value representing the weighted-average effect on the model prediction of including this feature. To avoid retraining for all subsets, Shapley Sampling values approximate the effect of removing a variable from the model by integrating over samples from the training dataset;
  "Kernel-SHAP", a regression-based, model-agnostic method that uses linear LIME, along with Shapley values, to find a weighting kernel for building a local explanation model; and
  "Deep-SHAP", a deep neural network model-specific approach that leverages DeepLIFT and information about the network composition to approximate Shapley values for the whole network.

SHAP has a number of desirable properties that its precursors lacked: (i) local accuracy of the explanation model prediction; (ii) missingness—features missing in the original input must have no impact; and (iii) consistency when revising the original model. SHAP can be simply adapted to the present context. In particular, it can be adapted to a back-end frame 30 (see FIG. 2) aiming to aid explainability and validation to the anomalies detected by the mid-end platform 10, which preferably relies on an autoencoder, as discussed later.

As noted above, the feature attribution need be complemented by a causal analysis to be able to direct the edges of the graph. Several causality algorithms can be contemplated. What is more, several causality algorithms may be concurrently or successively run, given the small number of KPIs retained and their relatively small span, as per the time window selected. That is, the causality algorithm run to obtain the causal graph may include independent causality (sub) algorithms. As such, running the overall causality algorithm results in obtaining distinct causal graphs, having distinct sets of directed edges with distinct sets of evaluated weights of directed edges. The distinct sets of directed edges form distinct sets of directed paths.

Interestingly, the method may obtain S40 and return a composite graph by combining the distinct causal graphs obtained. Thus, experts may subsequently investigate a composite graph juxtaposing several sets of edges with different weight types, as shown in FIG. 5.

In addition, the distinct causal graphs may be further combined with a preliminary graph obtained based on the importance values and/or other outputs from the feature importance attribution algorithm. That is, the present methods may further obtain S32 a preliminary graph of vertices mapping the aKPIs and xKPIs, where the vertices are connected by edges weighted in accordance with outputs from the feature importance attribution algorithm. The present methods may then combine S40 the preliminary graph with the distinct causal graphs to form a composite graph 36 such as shown in FIG. 5. In this example, the full-line arrows correspond to edges weighted in accordance with the feature importance attribution algorithm. However, such edges are subsequently oriented thanks to outcomes of the causality algorithms. Additional directed edges are discovered by the causality algorithms in this example. The dashed-dotted edge is identified and weighted by a pairwise temporal causality algorithm, while the dashed edge is obtained via an unsupervised, deep learning model discussed below.

As evoked above, the causality algorithm may notably include a pairwise temporal causality algorithm, which performs a temporal causality test. This test determines a causal direction and a corresponding weight for each pair of the vertices, so as to eventually determine directed edges and corresponding weights. Again, the directed edges form causality chains. The pairwise temporal causality algorithm is preferably based on a statistical, pairwise co-determination method. In particular, the temporal causality test performed may be a Granger causality test.

A Granger causality test is a statistical hypothesis test for determining whether one timeseries is useful in forecasting another. In the present context, the Granger algorithm tests for Granger causality across the targeted time period, and may reflect short delay lags (e.g., less than 10 time steps) in the causality chains. In more detail, the present methods may apply the Granger causality test (GCT) for every metrics pair $(X_t, Y_t)$ via two ordinary least-square regressions to analyze the model power of predicting: (i) $X_t$ with $Y_t$, and (ii) $X_t$ with the time-lagged $Y_{t-lag}$ for a predefined maximum lag, which is chosen large enough to cover the potential cause-effect delays. The two models can be compared via a statistical F-test with the null-hypothesis $H_0$ being that $Y_t$ does not Granger-cause $X_t$. $H_0$ is rejected if the p-values are below a significance threshold. Once all Granger causalities have been obtained via GCT, a causal graph of all considered KPIs (which are preferably limited to most representative KPIs, as explained later) is built and the cause→effect relationships are depicted as directed edges. The edge weights can for instance be set as the causal delays, which can be defined as the most significant lags (lowest p-values) in the GCT pair-wise regression forecasting models.

Importantly, this temporal causality test applies only to targeted pairs resulting from the feature importance attribution. I.e., the determination of the aKPIs/xKPI and the causality algorithm are hierarchically implemented to lower the feature space and, thus, the computational complexity.

The above causality algorithm can advantageously be complemented by a validation algorithm, the execution (step S36) of which discards some of the directed edges determined by the temporal causality algorithm. In particular, this validation may attempt to discard edges corresponding to bidirectional causations. In addition, or in variants, the validation algorithm may discard corresponding to causal relationships that persist after random shuffling a cause in a corresponding causality chain. I.e., in that case, a permutation-validation method is used to validate causalities found by discarding relationships that persist after random shuffling of the cause. The resulting causality algorithm gives rise to an interpretable, stateful, metrics dependency extractor, which enables scalable and targeted pair-wise causality exploration.

Other causality algorithms can be contemplated, in place of or in addition to the above causality algorithm. In particular, the present methods may run S38 a cognitive algorithm (after the pairwise co-determination S35-S36), where the cognitive algorithm learns the causal graph structure of the causal graph by discovering causal relationships between the xKPIs and the aKPIs. Such algorithms are known. For example, the cognitive algorithm may be based on or derived from the so-called "Temporal Causal Discovery Framework" (TCDF). However, in the present context, the TCDF framework is applied to a restricted set of KPIs, thanks to the feature importance attribution method used S32.

Further algorithms may similarly be used, and various heuristics may be contemplated, to combine the resulting causal graphs. In variants, the final causal graph may be obtained according to more basic graph operations. For examples, in each graph, edge weights that do not exceed a given threshold may be discarded. Then, the graphs may be combined by way of an intersection, whereby only the redundant causal edges would be maintained. Conversely, the final graph can be obtained as a union of the distinct graphs obtained, to make sure to maintain all available information.

Figure 2:
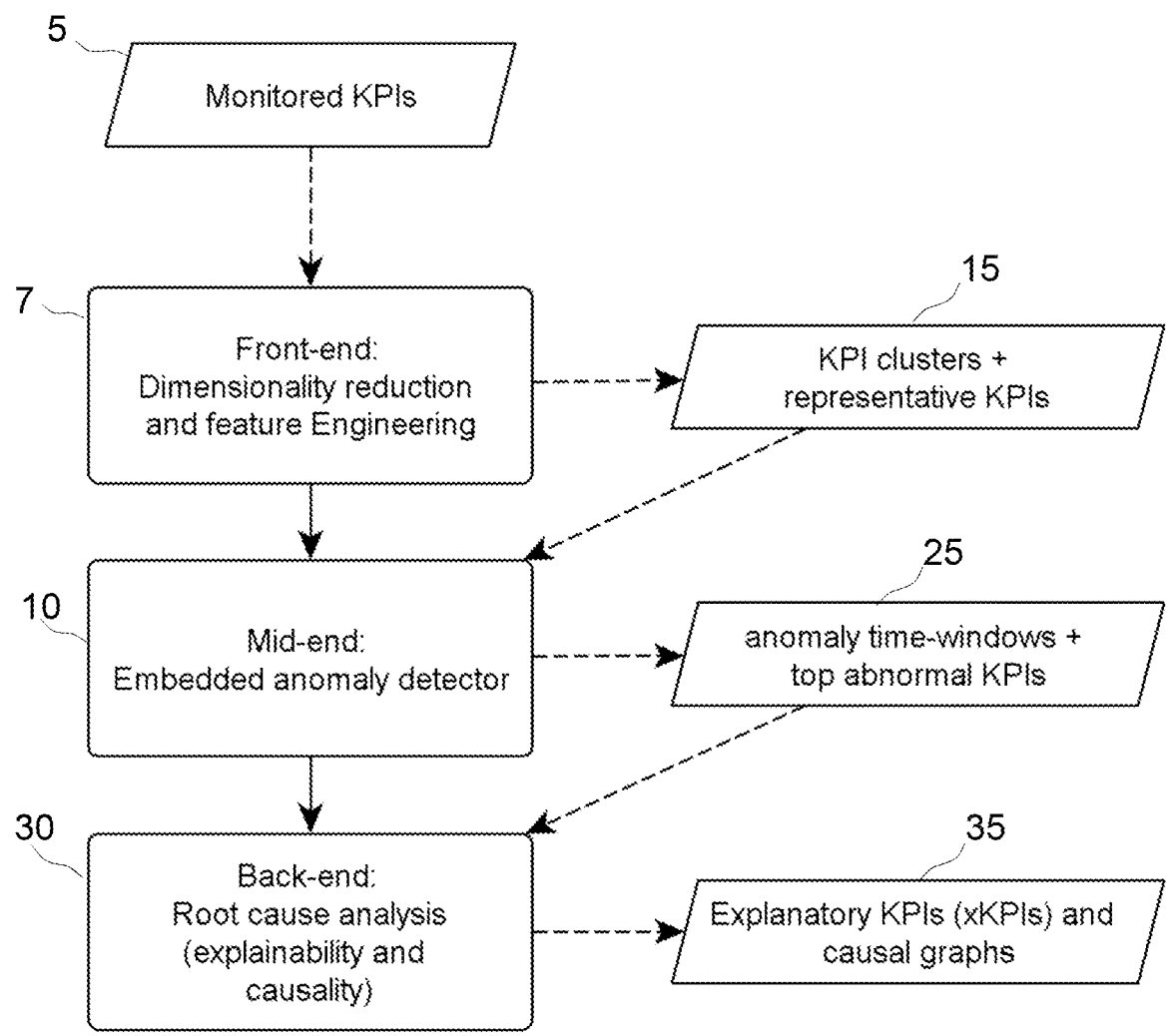
FIG. 2 is a high-level diagram illustrating a preferred pipeline of operations performed by front-end, mid-end, and back-end components, according to embodiments.

In embodiments, the anomaly is detected S10 by executing S7-S10 a sophisticated anomaly detection pipeline, e.g., implemented by the front-end component 7 and mid-end component 10 shown in FIG. 2.

The anomaly detection pipeline 7, 10 relies on monitored KPIs. The KPIs are categorized, before being fed to a cognitive model for characterizing the target system 2. Each KPI is categorized into one of n types of KPIs, where n≥2. This categorization is preferably achieved thanks to a clustering process, which is described later in detail. Next, KPI values are channeled through n buffer channels, in accordance with the n types of KPIs identified. That is, each of the n buffer channels buffers KPI values of KPIs of a respective one of the n types. Each buffer channel is basically a memory for temporarily storing values of the KPIs. I.e., the buffer channels store KPIs with a view to subsequently injecting the stored KPI values in input channels of the cognitive model, in order to characterize the system 2 based on outputs of the model. I.e., the KPI values buffered in the n buffer channels serve as input data for the cognitive model and are referred to as "initial KPI values" in the following.

The processing performed by the cognitive model preferably decomposes as follows. The initial KPI values (as buffered in the n buffer channels) are fed to n respective input channels of the cognitive model. The latter is implemented as an autoencoder by a trained neural network, i.e., an artificial neutral network (ANN). The autoencoder notably includes an encoder and a decoder. Basically, the ANN processes the initial KPI values to produce output values, based on which reconstructions errors are obtained. Remarkably, the encoder may include temporal convolutional layer blocks. The latter are connected by each of the n input channels. Consistently, the decoder includes deconvolution layer blocks, which are connected by the encoder. I.e., input channels connect to the encoder, which connects to the decoder. The ANN is configured in such a manner that the initial KPI values are independently processed in the n input channels, then compressed via the temporal convolutional layer blocks of the encoder, prior to being reconstructed via the deconvolution layer blocks of the decoder.

Eventually, reconstruction errors are obtained by comparing the reconstructed KPI values with the initial KPI values. I.e., reconstructs from the latent space of the autoencoder are exploited to compute reconstruction errors. This, in turn, makes it possible to characterize the computerized system 2 based on the reconstruction errors obtained, in an unsupervised manner.

The above approach enables an unsupervised pipeline, which exploits reconstruction errors obtained for KPIs channeled through multiple input channels of the ANN for characterizing the target computerized system 2, e.g., to detect an anomaly in the system 2 and troubleshoot the system 2, thanks to causal graphs obtained as explained above. The proposed architecture (in particular the temporal convolutional blocks and deconvolution counterparts) has advantages in terms of interpretability (explainability), scalability, and root cause analysis.

The encoder compresses the input KPIs into a latent space manifold that encodes the essential signal and then process it via the decoder, which attempts to reconstruct the initial KPIs from their compressed representations. Moreover, the cognitive model may possibly ingest a frontend data stream, which may already be compressed, e.g., by way of a selection of most representative KPIs. Still, the cognitive model allows additional compression to be achieved in its latent space, which is exploited for characterizing the system 2. The latent space manifold preferably involves 32 to 128 neurons (more preferably 64 neurons), as opposed to the hundreds to thousands of nodes used in input.

The temporal convolutional layer blocks allow temporality to be taken into account, in addition to spatial correlations between the KPIs. The temporal convolutional layer blocks enable interpretability inasmuch as dilation factors, even small, can directly be related to causality lags, a thing that is not possible with non-dilated convolutional models. In a causality context, non-linear neural networks have advantages as they allow to go beyond pairwise co-determination algorithms. Furthermore, the above scheme makes it possible to relax KPI constraints in terms of strict stationarity and linear time-invariance that prior methods often impose.

The data aggregation and categorization can be performed repeatedly, so as to continually feed the cognitive model with data and continually characterize the system 2 of interest, possibly in (near) real-time. I.e., KPI values may possibly be continually fed into respective input channels of the cognitive model. Thus, the anomaly detection pipeline may be used to detect potential anomalies in (near) real-time. However, the present detection methods may also be performed on specific occasions, e.g., in respect of past timeseries, to detect past anomalies in the system 2 (e.g., for forensic purposes).

Some of the initial KPIs may possibly be discarded, after preprocessing. The KPIs are categorized as objects of n respective types, i.e., as objects having different properties as per the procedure used to identify them. Now, the categorization performed may advantageously involve substantial precompression, thanks to a clustering process and a selection of representative KPIs in each cluster. Namely, after the preprocessing, the KPIs may be clustered, so as to obtain k clusters, where k≥2. Each cluster includes at least m KPIs, where m>n. That is, each cluster should include a number m of KPIs that is larger than the number n of input channels, for reasons that will become apparent below. Next, representative KPIs can be identified in each of the clusters formed. That is, for each cluster of the k clusters obtained thanks to the clustering process, n representative KPIs are identified in each cluster. The representative KPIs are identified as objects of distinct types. Finally, KPI values of the n representative KPIs identified can be buffered in respective ones of the n buffer channels.

The representative KPIs are preferably identified so as to exhibit antagonistic or contrasting properties, as per the metric used to identify them. Preferred is to select a central KPI and a peripheral KPI in each cluster. That is, the n representative KPIs identified in each cluster may include a central KPI (cR-KPI) and a peripheral KPI (pR-KPI) of this cluster, e.g., the most central and the most peripheral KPIs. For example, the KPIs can be ordered in each cluster according to their distances to the centroid of that cluster, which makes it possible to easily determine the representative KPIs. Preferably, use is made of the most central KPI and the most peripheral KPI only, such that only two buffer channels and two inputs channels are needed in that case. The most central and the most peripheral KPIs can be regarded as statistically normal and abnormal KPIs, respectively.

In preferred embodiments, the KPIs are iteratively clustered thanks to a k-shape algorithm. The k-shape clustering algorithm is a robust, iterative refinement algorithm that scales linearly with the number of features and creates k-well-separated, homogeneous clusters. This clustering process is iterative: the algorithm first randomly initializes the timeseries' assignments to clusters and then iteratively updates the assignments based on distances to the cluster centroids. In practice, one preferably seeks to obtain 8 to 10 clusters, eventually. The k-shape algorithm relies on the so-called shape-based distance (SBD), which uses a normalized cross-correlation (NCC) measure that compares the shapes of the timeseries shapes and hence can detect pairwise similarities, even for lagged (non-simultaneous) co-dependencies.

Next, the algorithm may aggregate timeseries corresponding to representative KPIs of each type. I.e., representative KPIs of a given type form a set $\{x_{j1}, x_{j2}, \ldots, x_{jm}\}$, $\{x_{k1}, x_{k2}, \ldots, x_{km}\}, \ldots \}$, where $\{x_{j1}, x_{j2}, \ldots x_{jm}\}$ corresponds to one representative KPI of that given type. The corresponding KPIs are then fed into a respective input channel of the neural network. In other words, n-uplets of KPIs are identified, and the KPIs of each n-uplet is subsequently fed into the $n^{th}$ input channel of the cognitive model. Time data do typically not need to be fed into the model, because they do not provide learnable information. However, they are typically saved, in order to later map the anomalous indices detected to time points, e.g., when investigating incidents.

In principle, one may have any number n of input channels, provided that this number is smaller than the average number of KPIs in each cluster. That is, if k clusters of KPIs are identified, which, on average, include M KPIs, then n must be strictly smaller than M. To that aim, one may need to adapt the number k of clusters formed to ensure that a sufficiently large number of KPIs are included in each cluster. That said, the number n of channels is preferably chosen to be small, to increase the compression achieved through the clustering and selection process.

The number n of channels is preferably chosen to be equal to 2 (i.e., n=2). In that case, the two representative KPIs identified for each cluster may correspond to the most central KPI (cR-KPI) and the most peripheral KPI (pR-KPI) in this cluster. This means that the buffer channels consist of two buffer channels only. Similarly, the input channels of the neural network consist of two input channels only, i.e., a first input channel and a second input channel. Thus, the central KPIs of the k clusters can be buffered in a first buffer channel and fed into the first input channel, while peripheral KPIs of the k clusters are buffered in a second buffer channel and fed into the second input channel. For example, two data streams of representative KPIs (central and peripheral KPIS) can be formed, from which two compressed channels (the buffer channels) are built, which are later ingested by the cognitive model. Combining the k-shape clustering algorithm with a two-channel extraction (for central and peripheral representative KPIs only) allows a particularly efficient compression to be achieved.

In addition, a frequency-based aggregation mechanism can be used, whereby the most frequently occurring KPIs are selected, e.g., according to a percentage or heuristic. The aggregation mechanism may for instance aggregate weekly representative KPIs that are the most frequently occurring in one month into monthly KPI channels. Applying this to both the central and peripheral representative KPIs yields two monthly channels. Still, the channeling algorithm may ensure that both channels are equally sized, according to a predefined channel size (e.g., specified by a user). This makes it possible to achieve balance between capturing: (i) the current representative trends, and (ii) the core system behavior during an extended time period. For example, each KPI may be a vector aggregating one week of data (2016 points), corresponding to 5 min time lags. The same procedure can be run for several successive weeks; the most frequent KPIs are then picked up to extract monthly representatives.

In addition, the clusters are preferably ordered by cardinality, prior to feeding the buffered KPIs into the input channels. More precisely, the KPIs (as buffered in each of the two buffer channels) may be ordered in descending order of cardinality of the respective clusters. In other words, the representative KPIs of large clusters are buffered first. In practice, the ingestion tensor may be built cluster-by-cluster, from the largest to the smallest cluster by cardinality number of KPIs in each cluster. That is, one may first sort the clusters by cardinality, then sort and select the KPIs according to their distances to the centroids of the clusters, to select the representative KPIs. The benefit of such an ordering on the model performance can be evaluated at run-time.

The detection of an anomaly may notably lead to troubleshooting the computerized system 2, e.g., by performing a causal analysis as described earlier, albeit based on a selection of the representative KPIs that have been determined to contribute the most to the anomaly detected. In that respect, reducing the feature space to only a small number of KPIs (as achieved thanks to a pre-compression scheme proposed above) allows support engineers to analyze the system performance behavior more effectively, based on only a fraction of the large number of initial KPIs, and accordingly reduces incident resolution times. Moreover, this feature compression is crucial for scalable causality discovery of root anomalous culprits.

The following explains how anomalies can be detected, in preferred embodiments. Such embodiments rely on time-dependent indicators, which are obtained based on the reconstruction errors computed thanks to outputs provided by the ANN. The reconstruction errors are typically obtained by computing differences between the reconstructed KPI values and the initial KPI values, for each KPI and for each time point. Next, one may seek to identify abnormal values of the time-dependent indicators obtained. In turn, the computerized system can be characterized based on a selection of the KPIs that are found to contribute the most to the abnormal values identified. For example, the algorithm may pick the top-h KPIs that contribute the most to a given, abnormal value. In variant, the algorithm may select all the KPIs that contribute to more than a given fraction (e.g., 50%) of any abnormal value identified. In both cases, it is possible to automatically identify those KPIs that are responsible for the characterized state of the system 2, which eases the task of support engineers when analyzing the system 2, e.g., to resolve incidents. These KPIs are aggregated to form the aKPIs used in the root cause analysis discussed earlier.

The time-dependent indicators may notably be obtained by summing absolute values of the reconstruction errors obtained for the KPI values over all of the KPIs and, this, for each time point. That is, at each time point, the algorithm sums the reconstructions errors obtained for all KPI values corresponding to this time point. In variants, one may sum reconstruction errors obtained for a subset of the KPI values, this resulting in a small performance improvement. Abnormal values can then be identified by detecting those critical time points, at which the time-dependent indicators take abnormal values, e.g., exceed a threshold value.

Note, the algorithm may advantageously smooth the time-dependent indicators over time, to minimize false positives. More precisely, the reconstructions errors may be smoothed over time, after summing them, e.g., by summing the KPI values at each time point and then computing a moving average. This way, the time-dependent indicators are obtained as smoothed values for each time point and the critical time points are identified as points corresponding to time points at which the smoothed values exceed a threshold value.

One may for instance calculate the reconstruction error, for each KPI, as the squared distance between the initial KPI and reconstructed KPI (considered as vectors). The resulting distance can be normalized, e.g., by scaling in the [0, 1] range. Then, the mean error over all KPIs is smoothed over time, e.g., via a moving average function with a rolling (e.g., 4-hour) window with a certain overlap to obtain smoothed errors. The overlap may for example amount to 1, 2, or 3 hours. Preferably, a 3-hour overlap is used, which amounts to 75% of the rolling window, to achieve more granularity. In variants, other smoothing functions can be used, such as convolutions or low-pass filters.

In embodiments, the time points are identified according to a K-sigma thresholding method, i.e., based on the mean value m and the dispersion value s (e.g., the standard deviation) obtained for the smoothed values. The underlying assumption is that the majority of the data have a normal behavior and, thus, are correctly learned and reconstructed by the cognitive model. The K-sigma thresholding method classifies a time point as anomalous if the corresponding smoothed error exceeds m+K×s. That is, a timestep t is classified as anomalous if and only if its smoothed error exceeds a threshold set to m+K×s. The hyper parameter K controls the tolerance to outliers and is usually set to 2, which corresponds to the $95^{th}$ percentile of a Gaussian distribution. Finally, for each anomaly, the algorithm may for instance extract the top-f KPI contributors to the anomalous reconstruction error. Consecutive anomalous time-points are preferably grouped in anomaly windows. I.e., a residual error-based post-processor is used to identify the anomaly windows. In some applications, sustained anomalies (e.g., lasting several hours) may be particularly interesting to track. In such applications, the algorithm may for instance filter out point outliers (short-lived bursts), e.g., lasting less than 15-minutes, as these do typically not require further investigation by the support engineers. In such applications, the outputs provided to the support engineers, at post-processing (i.e., downstream the cognitive model), may include anomaly windows, together with corresponding top-f KPI contributors, i.e., the aKPIs, as well as the causal graphs (or the composite graph) computed for each anomaly.

Figure 6:
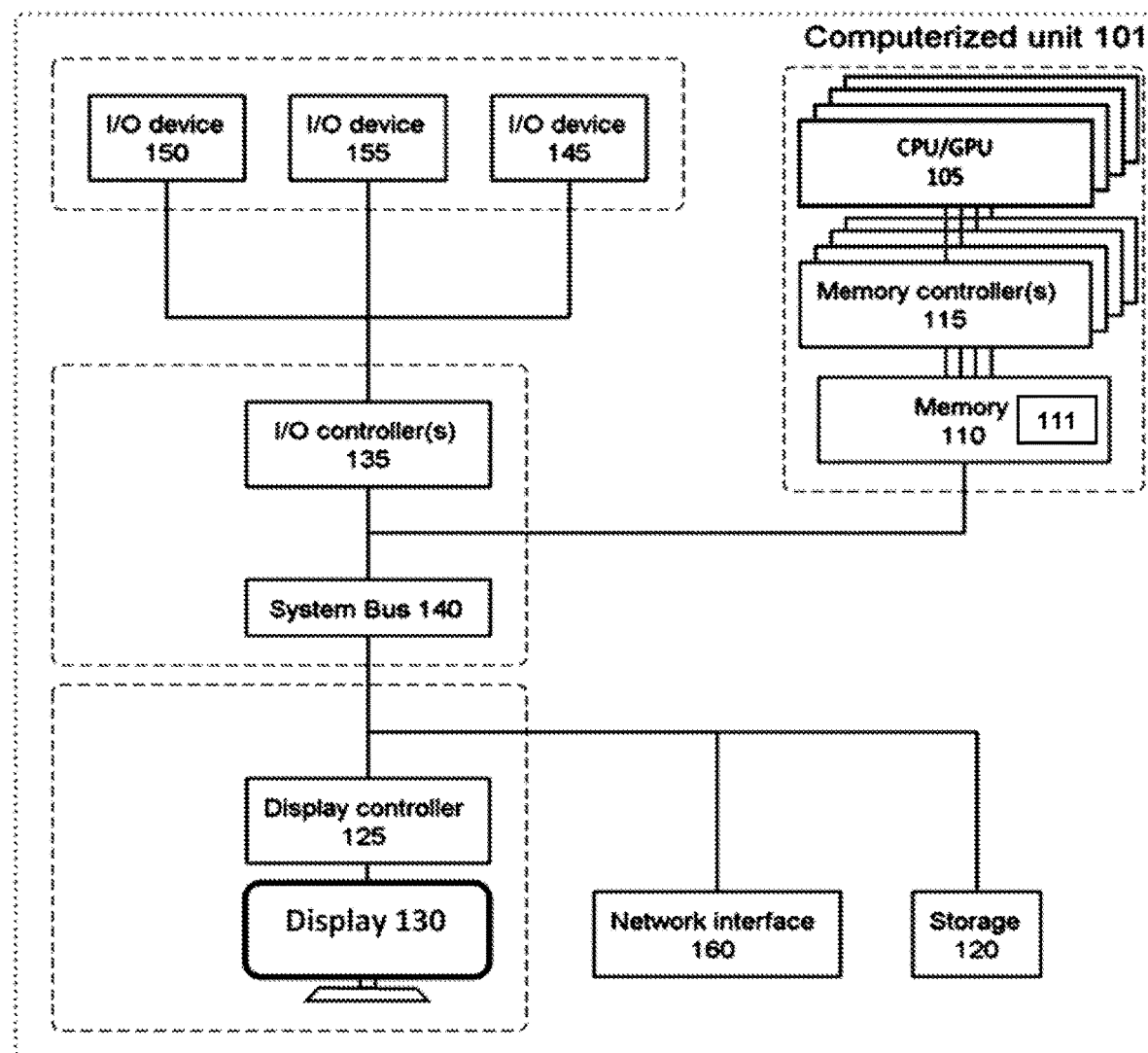
FIG. 6 schematically represents a general-purpose computerized system, suited for implementing one or more method steps as involved in embodiments of the invention.

Next, according to another aspect, the invention can also be embodied as a computer program product, which comprises a computer readable storage medium having program instructions embodied therewith. Such instructions typically form a software, e.g., stored in the storage 120 of a computerized unit such as shown in FIG. 6 (also corresponding to the computer 1 in FIG. 1). The program instructions can be executed by processing means 105 of such a unit 101 to cause the latter to perform steps according to the present methods.

The above embodiments have been succinctly described in reference to the accompanying drawings and may accommodate a number of variants. Several combinations of the above features may be contemplated.

FIG. 3 shows a high-level flow of operations according to preferred embodiments. Multiple KPIs are continuously monitored, step S5. Such KPIs form respective univariate timeseries. Various preprocessing steps are performed at step S7, including a substantial dimensionality reduction, whereby representative KPIs are selected via a clustering process, as described above. Next, when an anomaly is detected (based on preprocessed KPIs), step S10, a causal graph is constructed S30, in an unsupervised manner. To start with, an adequate troubleshooting time window (of given time period) is determined at step S31. At step S32, a subset of the KPIs is determined, including aKPIs and xKPIs. The aKPIs are determined by the anomaly detection pipeline, whereas a priori relevant xKPIs are identified thanks to a feature importance attribution algorithm, which scores S33 the importance of xKPIs to aKPIs as Shapley values. Next, a first causality algorithm (Granger) is used S35 to obtain a first causal graph with weighted, directed edges. Such edges are subsequently refined S36 using a permutation-validation method, which notably discard bidirectional causations and coincidentally persisting causal relationships. A second causal graph is then obtained S38 using the TCDF framework. All graphs are finally combined at step S40 and then provided S50 to support engineers for investigation.

As seen in FIG. 2, a preferred architecture involves a front-end 7, a mid-end 10, and a back-end 30. The front-end 7 performs the preprocessing, including the dimensionality reduction, based on timeseries obtained by monitoring the raw KPIs 5. As explained in section, this notably leads to cluster KPIs, with a view to identifying representative KPIs 15. The latter are used by the mid-end 10 to detect anomalies. The mid-end 10 outputs corresponding time windows, as well as the top abnormal KPIs 25, which are used to form the aKPI set. In turn, trimmed timeseries portions corresponding to the aKPIs are used by the back-end 30 to enable the root cause analysis. The back-end 30 outputs the xKPIs and the causal (or composite) graphs 35, for further analysis by automated process or support engineers. This architecture notably allows a reduced (sub)set of judiciously selected KPIs to be identified, e.g., to detect cloud performance anomalies, and their respective root causal culprits, all without critically compromising accuracy.

The proposed approach provides an explainable anomaly detection pipeline, capable to drill via causal inference from symptoms to root causes, and thus automate the deeply involved root cause analysis of anomalous events as occurring in complex systems such as cloud infrastructures.

FIG. 4 shows a composite graph obtained by apply a hierarchical ensemble (feature importance attribution, granger causality, and TCDF) to build a temporal causal graph as a composition of all subgraphs. The composition resembles a union, except for the edge weights.

Referring to FIG. 5, the pipeline of FIG. 2 was used to find the most-representative anomalous points during a detected anomaly and then explain the top-k contributors (T-KPIs), which are extracted based on their autoencoder reconstruction error. The T-KPIs are first explained using the SHAP framework, which provides feature importance Shapley values. Namely, the Read Transfer Size is explained by Cache to Host Transfer Response Time, the Shapley value is equal to 0.66, while the Back-end Write I/O Rate yields a value of 0.59. The Response Time is explained by Port to Local Node Send Queue Time (Shapley value: 0.29).

Next, causal relationships are discovered via a Granger method (dotted-dashed arrows) and a TCDF-based algorithm (dashed arrows), using a 16-hour troubleshooting window centered at the investigated anomalous point. One causal relationship with lag was found by each method. According to the Granger method, Port to Local Node Send Queue Time causes Back-end Write I/O Rate with lag value B 12 (i.e., 2 points), while the TCDF-based algorithm finds the Back-end Write I/O Rate to cause Response Time with lag value A 11 (i.e., 1 point).

The analysis suggest that one potential root cause is Port to Local Node Send Queue Time (cause), as it causes Back-end Write I/O Rate (infection), which then causes Response Time (symptom). The total causal lag is the sum of the two corresponding lag values, i.e., lag value A+lag value B=3 points (15-minutes). Such composite graphs have received positive validation from Subject Matter Experts (SMEs).

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 1:
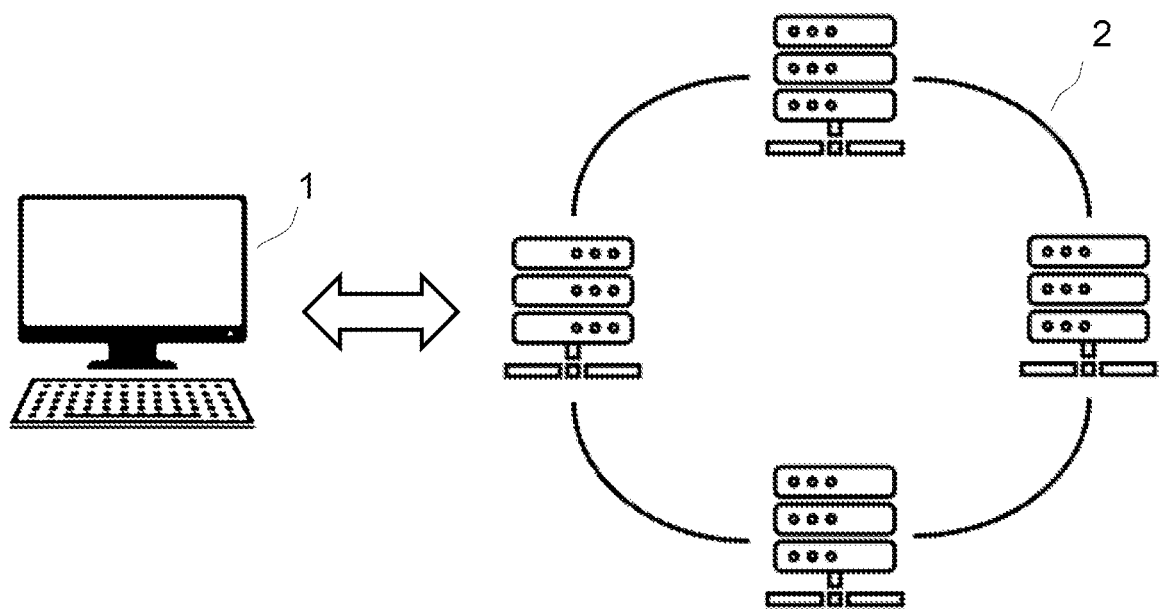
FIG. 1 schematically illustrates a characterization system interacting with a computerized system of interest, with a view to performing a root cause analysis of detected anomalies, according to embodiments.

For instance, each of the systems 1 and 2 shown in FIG. 1 may comprise one or more computerized units 101 (e.g., general- or specific-purpose computers), such as shown in FIG. 6. Each unit 101 may interact with other, typically similar units 101, to perform steps according to the present methods.

In exemplary embodiments, in terms of hardware architecture, as shown in FIG. 6, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 6, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may be a method, and/or a computer program product. The computer program product may include a computer readable storage medium (or media) having computer readable program instructions thereon for causing processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of root cause analysis of computerized system anomalies, wherein the method comprises:
    monitoring key performance indicators (KPIs) for a computerized system of interest, wherein KPI values of the monitored KPIs form respective timeseries;
    detecting an anomaly in the computerized system based on the monitored KPIs;
    determining a troubleshooting time window extending over a given time period, in accordance with the detected anomaly;
    identifying a strict subset of the monitored KPIs based on portions of the respective timeseries spanning the given time period, wherein the strict subset comprises abnormal KPIs (aKPIs) and potential explanatory KPIs (xKPIs);
    obtaining a causal graph of vertices mapping KPIs of the strict subset by running a causality algorithm to evaluate weights of directed edges connecting the vertices and accordingly obtain one or more directed paths, each connecting one of the xKPIs to one of the aKPIs; and
    returning the obtained causal graph to help troubleshoot the detected anomaly.

2. The method of claim 1, wherein identifying the strict subset further comprises:
    identifying the aKPIs based on outputs from an anomaly detection algorithm run to detect the anomaly; and
    running a feature importance attribution algorithm which causes to determine relative importance values of the monitored KPIs to each of the identified aKPIs during the given time period and identify the xKPIs based on the relative importance values determined.

3. The method of claim 2, wherein the method further comprises:
    storing the relative importance values in association with edges connecting the vertices.

4. The method of claim 2, wherein:
    the feature importance attribution algorithm is an additive feature attribution algorithm.

5. The method of claim 2, wherein the method further comprises:
    computing Shapley values based on outputs from the feature importance attribution algorithm.

6. The method of claim 2, wherein the causality algorithm run to obtain the causal graph includes independent causality algorithms, whereby running the causality algorithm results in obtaining distinct causal graphs having distinct sets of directed edges with distinct sets of evaluated weights of directed edges, the distinct sets of directed edges forming distinct sets of directed paths each connecting one of the xKPIs to one of the aKPIs, and wherein the method further comprises: obtaining a composite graph by combining the distinct causal graphs, whereby the obtained causal graph returned is the composite causal graph.

7. The method of claim 6, further comprising:
    after identifying the strict subset of the monitored KPIs and prior to obtaining the causal graph, obtaining a preliminary graph of vertices mapping the KPIs of the strict subset, wherein the vertices are connected by edges weighted in accordance with outputs from the feature importance attribution algorithm; and
    obtaining the composite graph by further combining the preliminary graph with the distinct causal graphs.

8. The method of claim 1, wherein
running the causality algorithm comprises running a pairwise temporal causality algorithm to perform a temporal causality test which determines a causal direction and a corresponding weight for each pair of the vertices and to determine the directed edges and the corresponding weights, wherein the directed edges form causality chains.

9. The method of claim 8, wherein the pairwise temporal causality algorithm is based on a statistical, pairwise co-determination method.

10. The method of claim 8, wherein the temporal causality test performed is a Granger causality test.

11. The method of claim 8, wherein the causality algorithm further comprises a validation algorithm, which is run as part of the causality algorithm to discard some of the directed edges determined by the temporal causality algorithm.

12. The method of claim 11, wherein the discarded edges comprise edges corresponding to bidirectional causations.

13. The method of claim 11, wherein the discarded edges further comprise edges corresponding to causal relationships that persist after random shuffling of a cause in a corresponding one of the causality chains.

14. The method of claim 1, wherein running the causality algorithm includes running a cognitive algorithm that learns a causal graph structure of the causal graph by discovering causal relationships between the xKPIs and the aKPIs.

15. The method of claim 1, wherein the anomaly is detected by executing an anomaly detection pipeline, which causes to:
categorize the monitored KPIs into one of n types of KPIs, where n≥2;
channel KPI values of the KPIs through n buffer channels, in accordance with the n types, wherein each of the n buffer channels buffers KPI values of KPIs of a respective one of the n types;
obtain reconstruction errors by feeding initial KPI values, as buffered in the n buffer channels, to n respective input channels of a cognitive model, wherein the cognitive model is implemented as an autoencoder by a trained neural network, the autoencoder comprising an encoder with temporal convolutional layer blocks connected by each of the n input channels and a decoder comprising deconvolution layer blocks connected by the encoder, and wherein the initial KPI values are independently processed in the n input channels, then compressed via the temporal convolutional layer blocks of the encoder prior to being reconstructed via the deconvolution layer blocks of the decoder, and wherein the reconstruction errors are obtained by comparing the reconstructed KPI values with the initial KPI values, and wherein the anomaly being detected is based on the reconstruction errors obtained.

16. The method of claim 15, wherein executing the anomaly detection pipeline further comprises, prior to channeling the KPI values;
clustering the KPIs to obtain k clusters, each k cluster comprising at least m KPIs, where m>n and k≥2; and
for each cluster of the k clusters obtained, identifying n representative KPIs in each cluster as objects of the n respective types, respectively, wherein the n representative KPIs identified for each cluster include a central KPI and a peripheral KPI.

17. The method of claim 16, wherein n=2, such that the n buffer channels comprise two buffer channels, including a first buffer channel and a second buffer channel, and the input channels of the cognitive model comprise two input channels, including a first input channel and a second input channel, and wherein the representative KPIs identified for each cluster comprise the central KPI and the peripheral KPI, and wherein central KPIs of the k clusters are buffered in the first buffer channel and fed into the first input channel, while peripheral KPIs of the k clusters are buffered in the second buffer channel and fed into the second input channel.

18. The method of claim 15, wherein executing the anomaly detection pipeline further causes to obtain time-dependent indicators based on the reconstruction errors obtained and identify abnormal values of the time-dependent indicators, and wherein the anomaly is detected based on a selection of the KPIs that contribute most to the abnormal values identified, and wherein the aKPIs are determined based on the selection of the KPIs.

19. The method of claim 18, wherein the time-dependent indicators are obtained by summing the reconstruction errors obtained for the KPI values over all of the KPIs for each time point of the time points spanned by the KPIs, and wherein the abnormal values are identified by identifying critical time points of the time points, at which the time-dependent indicators exceed a threshold value.

20. A computer program product for root cause analysis of computerized system anomalies, the computer program product comprising: one or more computer-readable tangible storage medium and program instructions stored on at least one of the one or more computer-readable tangible storage medium, the program instructions executable by a processor capable of performing a method, the method comprising: monitoring key performance indicators (KPIs) for a computerized system of interest, wherein KPI values of the monitored KPIs form respective timeseries; detecting an anomaly in the computerized system based on the monitored KPIs; determining a troubleshooting time window extending over a given time period, in accordance with the detected anomaly; identifying a strict subset of the monitored KPIs based on portions of the respective timeseries spanning the given time period, wherein the strict subset comprises abnormal KPIs (aKPIs) and potential explanatory KPIs (xKPIs); obtaining a causal graph of vertices mapping KPIs of the strict subset by running a causality algorithm to evaluate weights of directed edges connecting the vertices and accordingly obtain one or more directed paths, each connecting one of the xKPIs to one of the aKPIs; and returning the obtained causal graph to help troubleshoot the detected anomaly.

* * * * *